United States Patent
Ono

(10) Patent No.: US 8,996,271 B2
(45) Date of Patent: Mar. 31, 2015

(54) VEHICLE BRAKE CONTROL DEVICE AND METHOD

(75) Inventor: Shunsaku Ono, Kanagawa (JP)

(73) Assignee: Bosch Corporation, Tokyo (JP)

( * ) Notice: Subject to any disclaimer, the term of this patent is extended or adjusted under 35 U.S.C. 154(b) by 292 days.

(21) Appl. No.: 13/389,835

(22) PCT Filed: Sep. 4, 2009

(86) PCT No.: PCT/JP2009/065476
§ 371 (c)(1),
(2), (4) Date: May 2, 2012

(87) PCT Pub. No.: WO2011/027456
PCT Pub. Date: Mar. 10, 2011

(65) Prior Publication Data
US 2012/0209491 A1      Aug. 16, 2012

(51) Int. Cl.
| | |
|---|---|
| *B60T 7/12* | (2006.01) |
| *G05D 1/00* | (2006.01) |
| *G06F 7/00* | (2006.01) |
| *G06F 17/00* | (2006.01) |
| *B60T 8/1761* | (2006.01) |

(52) U.S. Cl.
CPC ................ *B60T 8/17616* (2013.01)
USPC ........................................................ 701/78

(58) Field of Classification Search
USPC ............. 701/78, 79; 303/20, 121, 122.01, 303/122.06, 138, 139, 155, 156, 157, 158, 303/159, 163, 164, 166, 167, 175, 113.1, 303/113.2, 119.1
See application file for complete search history.

(56) References Cited

U.S. PATENT DOCUMENTS

| 4,783,127 A | | 11/1988 | Kade et al. | |
|---|---|---|---|---|
| 4,790,607 A | * | 12/1988 | Atkins | ........................... 303/195 |
| 4,805,105 A | * | 2/1989 | Weiss et al. | ...................... 701/78 |
| 4,850,650 A | * | 7/1989 | Eckert et al. | .................. 303/9.62 |

(Continued)

FOREIGN PATENT DOCUMENTS

| EP | 0572808 | 12/1993 |
|---|---|---|
| JP | 2006-137382 | 6/2006 |
| JP | 2006-176046 | 7/2006 |

OTHER PUBLICATIONS

PCT/JP2009/065476 International Search Report.

(Continued)

*Primary Examiner* — Nicholas Kiswanto
(74) *Attorney, Agent, or Firm* — Michael Best & Friedrich LLP

(57) ABSTRACT

A brake control method. During ABS control, a control sequence, other than the conventional control sequence, based on the slip ratio and so forth resulting from the measurement value of a wheel speed sensor, and a minimum amount of pressure increase or a minimum amount of pressure decrease is ensured. In another embodiment, a control sequence independent from a control sequence based on the measurement value of a wheel speed sensor, sets allowable ranges relating to amounts of change in the pressure of a wheel cylinder, monitors the actual pressure value with a pressure sensor at the time of brake control, and, at a time when the pressure inside the wheel cylinder has deviated from these allowable ranges, drives an actuator such as an electromagnetic valve and controls in such a way that the pressure inside the wheel cylinder falls within an allowable range.

9 Claims, 2 Drawing Sheets

(56) References Cited

U.S. PATENT DOCUMENTS

| | | | |
|---|---|---|---|
| 5,064,253 A * | 11/1991 | Kuwana et al. | 303/156 |
| 5,150,299 A * | 9/1992 | Fujioka | 701/78 |
| 5,197,787 A * | 3/1993 | Matsuda et al. | 303/10 |
| 5,558,409 A * | 9/1996 | Walenty et al. | 303/10 |
| 5,662,388 A * | 9/1997 | Wuerth et al. | 303/3 |
| 5,720,534 A * | 2/1998 | Stumpe | 303/166 |
| 5,820,229 A * | 10/1998 | Pueschel | 303/139 |
| 6,030,055 A * | 2/2000 | Schubert | 303/113.4 |
| 6,238,019 B1 * | 5/2001 | Okazaki et al. | 303/146 |
| 6,322,164 B1 * | 11/2001 | Sakamoto et al. | 303/115.4 |
| 7,699,411 B2 * | 4/2010 | Nakaura et al. | 303/156 |
| 8,121,770 B2 * | 2/2012 | Zheng | 701/78 |
| 2002/0180262 A1 | 12/2002 | Hara et al. | |

OTHER PUBLICATIONS

International Preliminary Report on Patentability for Application No. PCT/JP2009/065476 dated Apr. 19, 2012 (7 pages).

* cited by examiner

VEHICLE BRAKE CONTROL DEVICE AND METHOD

BACKGROUND OF THE INVENTION

The present invention relates to a vehicle brake control unit and particularly relates to an antilock brake (ABS) control unit.

An ABS performs control that judges a wheel lock tendency, decreases the pressure inside a wheel cylinder to release a lock state when lock is detected, and gradually increases the pressure inside the wheel cylinder to strengthen the brake when the lock state is released. Consequently, in ABS control, if the pressure decrease in the wheel cylinder after a lock state of the wheel has been detected is insufficient, the lock state cannot be sufficiently eliminated. Further, if the pressure increase in the wheel cylinder after a lock state of the wheel has been released, the vehicle cannot be sufficiently decelerated. Therefore, in ABS control, it is desired to avoid an insufficient pressure decrease in the wheel cylinder after a lock state has been detected and an insufficient pressure increase in the wheel cylinder after a lock state has been released.

In ABS control, generally, a wheel lock tendency is judged by using a wheel speed sensor to calculate the slip rate of the wheel. The amount of pressure decrease and the amount of pressure increase at the time of ABS actuation are mainly decided on the basis of the result of measurement by the wheel speed sensor. There exist various ABS control algorithms for shortening the braking distance without compromising the stability of the vehicle. For example, there is a control scheme that estimates the friction coefficient μ of the road surface from the measurement value of the wheel speed sensor, decides a target amount of pressure decrease and a target amount of pressure increase in accordance with the estimated low μ or high μ road surface state, and drives and controls an electromagnetic valve so as to realize the decided amount of pressure decrease and amount of pressure increase. Alternatively, there is also a control scheme that uses a hydraulic pressure sensor when deciding the target amount of pressure decrease and the target amount of pressure increase (e.g., JP-A-2006-176046).

Generally in conventional ABS control, when the target amount of pressure decrease and the target amount of pressure increase to be applied to the wheel cylinder are decided, thereafter pressure control of the wheel cylinder is performed by an electromagnetic valve or the like so as to achieve the target amount of pressure change. However, even in the case of using a hydraulic pressure value that has been measured by a hydraulic pressure sensor for deciding the target amount of pressure change in the wheel cylinder, whether or not the pressure in the wheel cylinder has achieved the target value by the driving of the electromagnetic valve is not confirmed.

Consequently, it is not always the case that the actual pressure inside the wheel cylinder has become the decided target during the operation of the ABS, and due to the effects of the operating environment and so forth, depending on the case the amount of pressure increase and the amount of pressure decrease in the wheel cylinder at the time of ABS operation may potentially deviate from the proper value or range. As a result, the braking distance may potentially become longer in a case where the amount of pressure increase is insufficient, and the stability of the vehicle may potentially be compromised in a case where the amount of pressure decrease is insufficient.

Further, in ABS control of recent years, functions are becoming increasingly sophisticated, and sometimes complicated control logic is used, for example, to discriminate the road surface state and the vehicle state and change control parameters in accordance with those states. However, it is difficult to evaluate and test combinations of all states under every situation. For that reason, pressure control of the wheel cylinder may potentially be performed outside the proper range of change in the pressure in the wheel cylinder that is ordinarily conceivable. For example, the amount of pressure increase in the wheel cylinder may potentially become smaller than assumed in a case where a function that suppresses the pressure increase gradient of the pressure in the wheel cylinder at the time of ABS actuation as a result of discriminating the road surface state and a function that suppresses the pressure increase gradient of the pressure in the wheel cylinder at the time of ABS actuation as a result of discriminating the vehicle state have both acted. In such a case, the problem that the braking distance becomes longer than assumed may potentially arise.

Therefore, in a vehicle brake control device, it is desired to keep the actual amount of pressure increase and the actual amount of pressure decrease inside the wheel cylinder at the time of ABS control in the proper range even in the case of performing ABS control on the basis of any control logic.

SUMMARY OF THE INVENTION

The brake control according to the present invention is generally based on the following way of thinking. According to the brake control method of the present invention, at the time of ABS control, the method is equipped with a control sequence other than the conventional control sequence based on the slip ratio and so forth resulting from the measurement value of a wheel speed sensor, and a minimum amount of pressure increase or a minimum amount of pressure decrease at the time of ABS operation is ensured by this other wheel cylinder pressure control sequence. The other control sequence according to the invention of the present application, independently from a control sequence based on the measurement value of a wheel speed sensor, sets allowable ranges relating to amounts of change in the pressure of a wheel cylinder, monitors the actual pressure value with a pressure sensor at the time of brake control, and, at a time when the pressure inside the wheel cylinder has deviated from these allowable ranges, drives an actuator such as an electromagnetic valve and controls in such a way that the pressure inside the wheel cylinder falls within an allowable range. Consequently, according to the present invention, at the time of ABS control, by using the actual pressure value inside the wheel cylinder, the minimum amount of pressure increase or amount of pressure decrease at the time of ABS operation can be ensured independently from the conventional ABS control sequence using a wheel speed sensor. That is, according to the present invention, at the time of ABS operation, at a time when the pressure in the wheel cylinder is in an allowable range set by the present invention, a brake control unit measures the wheel speed with a wheel speed sensor and controls the pressure in the wheel cylinder on the basis of that measurement result like conventionally, but at a time when the actual pressure value (amount of pressure increase or amount of pressure decrease) inside the wheel cylinder measured by a pressure sensor has deviated from an allowable range set independently from the conventional ABS control logic, the pressure inside the wheel cylinder is additionally increased or decreased based on the basis of the other control sequence according to the present invention.

According to an embodiment of the present invention, there is provided a vehicle brake control method, the method including the steps of: measuring a pressure Pt1 inside a wheel cylinder at a time when a predetermined amount of time t1 has elapsed after a time when a wheel lock tendency has been detected; comparing Pt1 with a predetermined value Pmax_t1; and in a case where the condition of Pt1>Pmax_t1 is met in the step of comparing Pt1 with the predetermined value Pmax_t1, driving by a predetermined amount an actuator for decreasing the pressure in the wheel cylinder so as to decrease the pressure inside the wheel cylinder.

In the method according to this embodiment, preferably, the method further includes the step of measuring a pressure P01 inside the wheel cylinder at a time when a wheel lock tendency has been detected, and Pmax_t1 is expressed by Pmax_t1=P01−ΔPt1, with ΔPt1 being a value that is decided beforehand in accordance with the amount of time t1.

In the method according to this embodiment, preferably, the predetermined drive amount of the actuator is a fixed amount that is not changed during driving of the vehicle.

According to an embodiment of the present invention, there is provided a vehicle brake control method, the method including the steps of: measuring a pressure Pt2 inside a wheel cylinder at a time when a predetermined amount of time t2 has elapsed after a time when a wheel lock tendency has been detected and the wheel lock tendency has been eliminated as a result of decreasing the pressure inside the wheel cylinder; comparing Pt2 with a predetermined value Pmin_t2; and in a case where the condition of Pt2<Pmin_t2 is met in the step of comparing Pt2 with the predetermined value Pmin_t2, driving by a predetermined amount an actuator for increasing the pressure in the wheel cylinder so as to increase the pressure inside the wheel cylinder.

In the method according to this embodiment, preferably, the method further includes the steps of measuring a pressure P01 inside the wheel cylinder at a time when a wheel lock tendency has been detected and measuring a pressure P02 inside the wheel cylinder at a time when the wheel lock tendency has been eliminated by decreasing the pressure inside the wheel cylinder, and Pmin_t2 is decided in accordance with P02, P01−P02, and t2.

In the method according to this embodiment, preferably, the method further includes the steps of measuring a pressure P01 inside the wheel cylinder at a time when a wheel lock tendency has been detected and measuring a pressure P02 inside the wheel cylinder at a time when the wheel lock tendency has been eliminated by decreasing the pressure inside the wheel cylinder, and the predetermined drive amount of the actuator is decided in accordance with P01−P02.

According to an embodiment of the present invention, there is provided a vehicle brake control method, the method including the steps of: measuring a pressure Pt2_$n$ inside a wheel cylinder every time a predetermined amount of time t2 elapses after a time when a wheel lock tendency has been detected and the wheel lock tendency has been eliminated as a result of decreasing the pressure inside the wheel cylinder; comparing Pt2_$n$ with a predetermined value Pmin_t2_$n$; and in a case where the condition of Pt2_$n$<Pmin_t2_$n$ is met in the step of comparing Pt2_$n$ with the predetermined value Pmin_t2_$n$, driving by a predetermined amount an actuator for increasing the pressure in the wheel cylinder so as to increase the pressure inside the wheel cylinder.

The method according to this embodiment preferably further includes the steps of measuring a pressure P01 inside the wheel cylinder at a time when a wheel lock tendency has been detected, measuring a pressure P02 inside the wheel cylinder at a time when the wheel lock tendency has been eliminated by decreasing the pressure inside the wheel cylinder, and counting an amount of elapsed time t2_$n$ after the time when the wheel lock tendency is eliminated, and Pmin_t2_$n$ is decided in accordance with P02, P01−P02, and t2_$n$.

The method according to this embodiment preferably further includes the steps of measuring a pressure P01 inside the wheel cylinder at a time when a wheel lock tendency has been detected and measuring a pressure P02 inside the wheel cylinder at a time when the wheel lock tendency has been eliminated by decreasing the pressure inside the wheel cylinder, and the predetermined drive amount of the actuator is decided in accordance with P01−P02.

According to an embodiment of the present invention, there is provided a vehicle brake control device, the device including: a pressure sensor for measuring pressure that has been applied to a wheel cylinder; a wheel speed sensor that is used for detecting a wheel lock tendency; an actuator for controlling the pressure inside the wheel cylinder; and control means that is electrically connected to the pressure sensor, the wheel speed sensor, and the actuator, wherein the control means receives from the pressure sensor a pressure Pt1 inside the wheel cylinder at a time when a predetermined amount of time t1 has elapsed after a time when a wheel lock tendency has been detected by the wheel speed sensor, compares Pt1 with a predetermined value Pmax_t1, and, in a case where the condition of Pt1>Pmax_t1 is satisfied, drives the actuator by a predetermined amount so as to decrease the pressure inside the wheel cylinder.

In the device according to this embodiment, preferably, the control means further receives from the pressure sensor a pressure P01 inside the wheel cylinder at a time when a wheel lock tendency has been detected by the wheel speed sensor, and Pmax_t1 is expressed by Pmax_t1=P01−ΔPt1, with ΔPt1 being a value that is decided beforehand in accordance with the amount of time t1.

In the device according to this embodiment, preferably, the predetermined drive amount of the actuator is a fixed amount that is not changed during driving of the vehicle.

According to an embodiment of the present invention, there is provided a vehicle brake control device, the device including: a pressure sensor for measuring pressure that has been applied to a wheel cylinder; a wheel speed sensor that is used for detecting a wheel lock tendency; an actuator for controlling the pressure inside the wheel cylinder; and control means that is electrically connected to the pressure sensor, the wheel speed sensor, and the actuator, wherein the control means receives from the pressure sensor a pressure Pt2 inside the wheel cylinder at a time when a predetermined amount of time t2 has elapsed after a time when a wheel lock tendency has been detected by the wheel speed sensor and the wheel lock tendency has been eliminated as a result of decreasing the pressure inside the wheel cylinder, compares Pt2 with a predetermined value Pmin_t2, and, in a case where the condition of Pt2<Pmin_t2 is met, drives the actuator by a predetermined amount so as to increase the pressure inside the wheel cylinder.

In the device according to this embodiment, preferably, the control means receives from the pressure sensor a pressure P01 inside the wheel cylinder at a time when a wheel lock tendency has been detected by the wheel speed sensor, the control means further receives from the pressure sensor a pressure P02 inside the wheel cylinder at a time when the wheel lock tendency has been eliminated by decreasing the pressure inside the wheel cylinder, and Pmin_t2 is decided in accordance with P02, P01−P02, and t2.

In the device according to this embodiment, preferably, the control means receives from the pressure sensor a pressure P01 inside the wheel cylinder at a time when a wheel lock tendency has been detected by the wheel speed sensor, the control means further receives from the pressure sensor a pressure P02 inside the wheel cylinder at a time when the wheel lock tendency has been eliminated by decreasing the pressure inside the wheel cylinder, and the predetermined drive amount of the actuator is decided in accordance with P01−P02.

According to an embodiment of the present invention, there is provided a vehicle brake control device, the device including: a pressure sensor for measuring pressure that has been applied to a wheel cylinder; a wheel speed sensor that is used for detecting a wheel lock tendency; an actuator for controlling the pressure inside the wheel cylinder; and control means that is electrically connected to the pressure sensor, the wheel speed sensor, and the actuator, wherein the control means receives from the pressure sensor a pressure $Pt2\_n$ inside the wheel cylinder every time a predetermined amount of time t2 elapses after a time when a wheel lock tendency has been detected by the wheel speed sensor and the wheel lock tendency has been eliminated as a result of decreasing the pressure inside the wheel cylinder, compares $Pt2\_n$ with a predetermined value $Pmin\_t2\_n$, and, in a case where the condition of $Pt2\_n < Pmin\_t2\_n$ is met, drives the actuator by a predetermined amount so as to increase the pressure inside the wheel cylinder.

In the device according to this embodiment, preferably, the control means receives from the pressure sensor a pressure P01 inside the wheel cylinder at a time when a wheel lock tendency has been detected by the wheel speed sensor, the control means further receives from the pressure sensor a pressure P02 inside the wheel cylinder at a time when the wheel lock tendency has been eliminated by decreasing the pressure inside the wheel cylinder, the control means further counts an amount of elapsed time $t2\_n$ after the time when the wheel lock tendency is eliminated, and $Pmin\_t2\_n$ is decided in accordance with P02, P01−P02, and $t2\_n$.

In the device according to this embodiment, preferably, the control means receives from the pressure sensor a pressure P01 inside the wheel cylinder at a time when a wheel lock tendency has been detected by the wheel speed sensor, the control means further receives from the pressure sensor a pressure P02 inside the wheel cylinder at a time when the wheel lock tendency has been eliminated by decreasing the pressure inside the wheel cylinder, and the predetermined drive amount of the actuator is decided in accordance with P01−P02.

According to an embodiment of the present invention, there is provided a vehicle including the vehicle brake control device according to the present invention.

As described above, in the brake control device and method according to the present invention, the actual pressure inside a wheel cylinder at the time of ABS control can be reliably kept in a certain allowable range even if ABS control has been performed in any control scheme, and the robustness of the brake control device can be improved.

DETAILED DESCRIPTION

Figure 1:
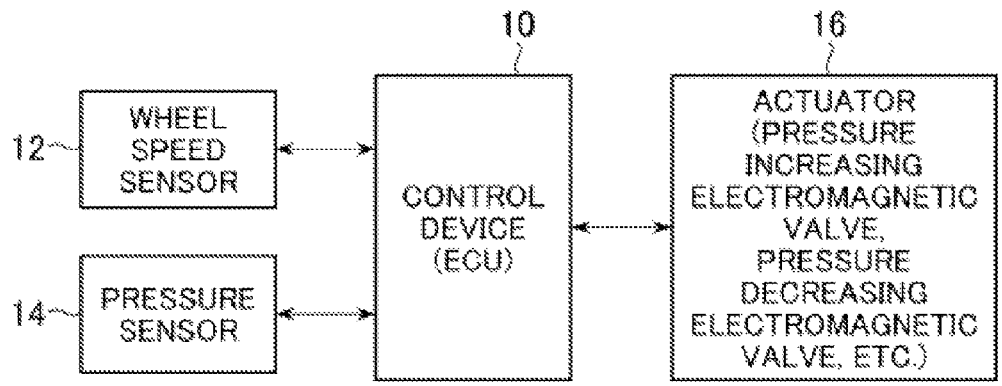
FIG. 1 is a diagram showing the configuration of a vehicle brake control device according to an embodiment of the present invention.

As shown in FIG. 1, a vehicle brake control unit according to the embodiment of the present invention is equipped with a control device (ECU) 10, a wheel speed sensor 12, a pressure sensor 14, and an electromagnetic valve 16.

The hardware configuration of the ECU 10 is publicly known in the present technical field, so it will not be described in detail in the present specification. In the present embodiment, an ECU with an arbitrary configuration equipped with a CPU, a memory, an input/output device, and so forth can be used. In the present embodiment, a control program for performing ABS control according to the present invention is installed in the ECU 10. Further, the ECU 10 is electrically connected to the later-described wheel speed sensor 12, pressure sensor 14, and electromagnetic valve 16 and can supply power to the wheel speed sensor 12 and the pressure sensor 14, receive signals from these sensors, and control the driving of the electromagnetic valve 16.

The wheel speed sensor 12 is, as is known in the present technical field, placed in the vicinity of a wheel of a vehicle and detects the speed of rotation of the wheel. The configuration and placement of the wheel speed sensor 12 itself are publicly known in the current technical field, so they will not be described in detail in the present specification. In the present embodiment, an arbitrary wheel speed sensor can be used. For example, a wheel speed sensor that detects the speed of rotation of the wheel of the vehicle electromagnetically or optically can be used. The wheel speed sensor 12 is connected to the ECU 10, and the ECU 10 performs control of the wheel speed sensor 12 such as supplying power to the wheel speed sensor 12 and sending signals to and receiving signals from the wheel speed sensor 12.

The pressure sensor 14 detects the pressure inside a wheel cylinder of the vehicle. The configuration and placement of the pressure sensor 14 itself are publicly known in the current technical field, so they will not be described in detail in the present specification. In the present embodiment, a pressure sensor with an arbitrary configuration can be used. For example, a type of pressure sensor that measures the deformation of a diaphragm with a strain gauge or a pressure sensor that utilizes a semiconductor can be utilized. The pressure sensor 14 is connected to the ECU 10, and the ECU 10 performs control of the pressure sensor 14, such as supplying power to the pressure sensor 14 and sending signals to and receiving signals from the pressure sensor 14.

The electromagnetic valve 16 is placed inside a hydraulic circuit of the vehicle and functions as an actuator that is electromagnetically driven in response to a command from the ECU 10 and controls the movement of hydraulic fluid inside the hydraulic circuit. The configuration and placement of the electromagnetic valve 16 itself are publicly known in the current technical field, so they will not be described in detail in the present specification, but the electromagnetic valve 16 includes a pressure increasing valve 16a, a pressure decreasing valve 16b, and so forth. The electromagnetic valve 16 is connected to the ECU 10, and the ECU 10 controls the operation of the electromagnetic valve 16. In the present embodiment, the electromagnetic valve 16 is used, but in the present invention being able to electromagnetically drive the actuator is not an essential requirement, and an actuator that controls brake force with another scheme may also be used.

The system configuration shown in FIG. 1 is not intended to limit the system configuration of the vehicle brake control unit of the present invention, and it is possible to increase or decrease system components to the extent that it is not contrary to the spirit of the present invention. The hardware configuration of the vehicle brake control unit of the present embodiment is, except for being equipped with the pressure sensor 14, the same as that of a conventionally common vehicle brake control unit and can be given an arbitrary configuration.

In the present embodiment, a program that executes conventional ABS control and a program that controls the amount of pressure increase and/or the amount of pressure decrease in the wheel cylinder according to the present invention are installed in the ECU 10. In the present specification, the term "conventional ABS control" means a control sequence that controls an electromagnetic valve of a brake circuit mainly on the basis of a measurement value resulting from a wheel speed sensor and does not necessarily have to be a publicly known ABS control sequence at the time of the filing of the present application. Further, the term "conventional ABS control" is a concept that also includes a control sequence that utilizes a measurement value resulting from a pressure sensor in part of the control sequence to the extent that it is not a control sequence that performs operation control of an electromagnetic valve directly on the basis of the measurement value of the pressure sensor like in the embodiment of the present invention described below. Consequently, a scheme that uses a hydraulic pressure sensor to decide a target hydraulic pressure value as described in patent document 1, for example, is also included in "conventional ABS control." To give an example of conventional ABS control logic, the ECU 10 calculates the slip ratio of the wheel from the measurement value of the wheel speed sensor 12 and controls the electromagnetic valve 16 in such a way that the slip ratio becomes a predetermined value. Specifically, this is a control sequence where, when the slip ratio of the wheel exceeds a predetermined value, the ECU 10 judges that the wheel is in a lock tendency and drives the pressure decreasing valve 16b to decrease the pressure inside the wheel cylinder and, when the slip ratio decreases to the predetermined value, the ECU 10 drives the pressure increasing valve 16a to raise the pressure in the wheel cylinder.

As is described in the summary of the invention, in the ECU 10 of the vehicle brake control unit of the present embodiment, in addition to the program that executes conventional ABS control, a program that controls the electromagnetic valve 16 on the basis of the measurement value resulting from the pressure sensor 14 that measures the pressure inside the wheel cylinder is installed. For convenience of description, hereinafter the sequence that controls the electromagnetic valve 16 directly on the basis of the measurement value resulting from the pressure sensor 14 that measures the pressure inside the wheel cylinder, which sequence is described in the summary of the invention and which is added to the conventional ABS control sequence, will sometimes be referred to as an "other control sequence" or an "additional control sequence".

The vehicle brake control sequence of the present invention according to the embodiment of the present invention will be described below together with FIGS. 2 to 4.

Figure 2:
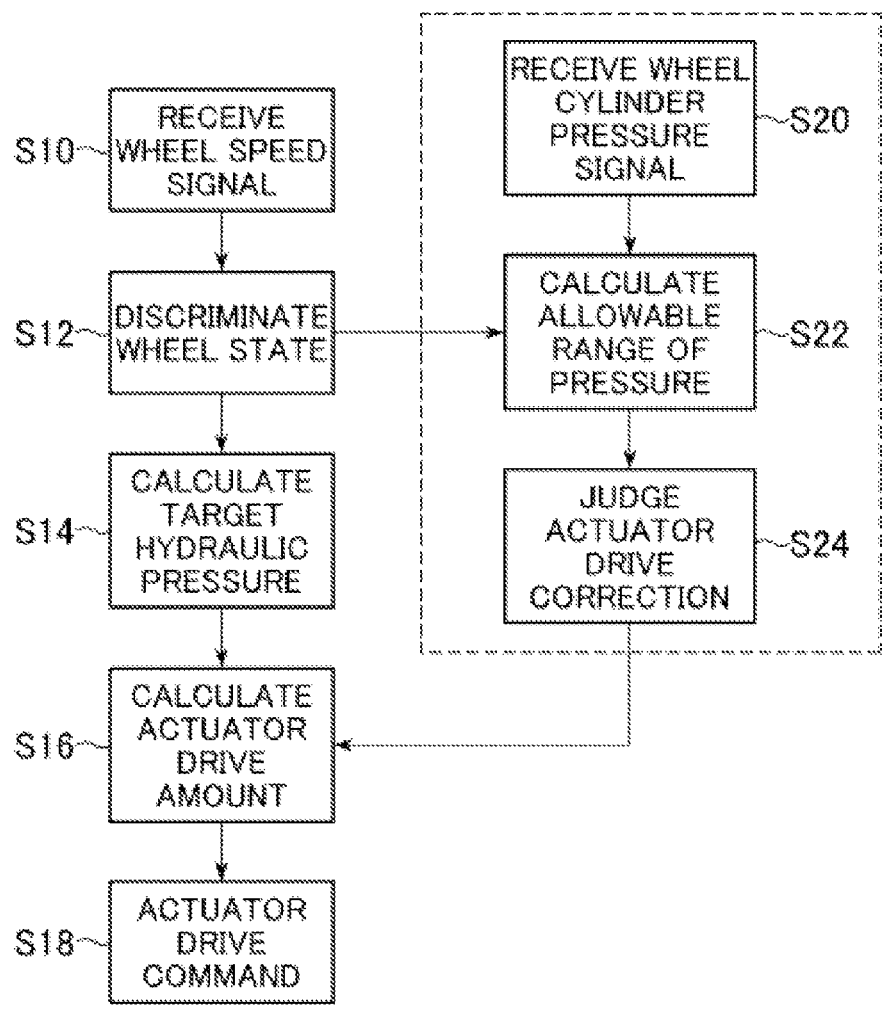
FIG. 2 is a diagram showing an operation flow of a vehicle brake control method according to the embodiment of the present invention.

FIG. 2 shows, in accordance with a flow of processing inside the ECU 10, a flowchart for executing the control sequence during ABS operation of the present invention. In FIG. 2, the portion enclosed by the dashed line is an example of the other control sequence added by the present invention, and the rest is substantially the same as the conventional ABS control sequence.

First, the portion corresponding to the conventional ABS control sequence will be briefly described. In step S10, the ECU 10 receives the wheel speed that has been measured by the wheel speed sensor 12.

Next, in step S12, the ECU 10 discriminates the state of the wheel from the received wheel speed. Specifically, the ECU 10 calculates the slip ratio, judges that the wheel is in a lock tendency and is "unstable" if the slip ratio is larger than a predetermined value, and judges that the wheel is "stable" if the slip ratio is equal to or less than the predetermined value. The method of calculating the slip ratio and the predetermined value relating to the slip ratio can be appropriately designed by persons skilled in the art on the basis of the conventional ABS control sequence.

Next, in step S14, the ECU 10 calculates a target amount of pressure increase or a target amount of pressure decrease in the wheel cylinder in accordance with the state of the wheel that is judged in step S12. Specifically, the target amount of pressure decrease is calculated in a case where the wheel is unstable, and the target amount of pressure increase is calculated in a case where the wheel is stable. The method of calculating the target amount of pressure increase and the target amount of pressure decrease can be appropriately designed by persons skilled in the art on the basis of the conventional ABS control sequence.

In the next step S16, the ECU 10 calculates a drive amount of the actuator that is needed for achieving the target amount of pressure decrease or the target amount of pressure decrease that is calculated in step S14. Specifically, the ECU 10 calculates a drive time of the pressure increasing valve 16a or the pressure decreasing valve 16b, for example. As another embodiment, in the case of using another actuator, the ECU 10 calculates the drive amount of that actuator. For example, in the case of an actuator using a pulse motor, the ECU 10 calculates the number of pulses to be applied and so forth. Although it will be described later, an additional drive amount of the actuator that has been decided in step S24 is added as needed in step S16.

Next, in step S18, the ECU 10 issues a drive command with respect to the actuator for driving the actuator by the drive amount that is calculated in step S16. Thereafter, the ECU 10 returns to step S10 and repeats the above-described processing.

The portion that is the conventional ABS control sequence of the ABS control sequence according to the embodiment of the present invention is as described above, but the control sequence that is enclosed by the dashed line in FIG. 2 and will be described below is added to the control sequence according to the embodiment according to the present invention.

In step S20, the ECU 10 receives a wheel cylinder pressure signal that has been measured by the pressure sensor 14.

Next, in step S22, the ECU 10 calculates an allowable range of the wheel cylinder pressure on the basis of the received pressure signal and the wheel state that is discriminated in step S12. The allowable range of the wheel cylinder pressure will be described later, but the allowable range of the wheel cylinder pressure is delimited by at least one of an allowable maximum pressure Pmax or an allowable minimum pressure Pmin.

Next, in step S24, the ECU 10 judges whether or not to drive the electromagnetic valve 16 on the basis of the pressure value that is received in step S20 and the allowable range of pressure that is calculated in step S22. Specifically, in a case where the wheel cylinder pressure that is received in step S20 is smaller than the allowable minimum pressure Pmin, the ECU 10 judges that it should increase the pressure in the wheel cylinder, and in a case where the wheel cylinder pressure is larger than the allowable maximum pressure Pmax, the ECU 10 judges that it should decrease the pressure in the wheel cylinder. The drive amount of the electromagnetic valve 16 for increasing the pressure or decreasing the pressure at this time is added to the drive amount of the electromagnetic valve 16 that is calculated on the basis of the conventional ABS control sequence in step S16. The drive amount of the electromagnetic valve 16 that should be added here will be described later.

Situations where the control sequence shown in FIG. 2 is executed in the case of actually controlling the brake of the vehicle will be described together with changes in the pressure in the wheel cylinder shown in FIGS. 3 and 4. FIG. 3 and FIG. 4 schematically show temporal changes in the pressure in the wheel cylinder based on the ABS control sequence according to the embodiment of the present invention. In these figures, the horizontal axis represents time and the vertical axis represents the pressure in the wheel cylinder.

Figure 3:
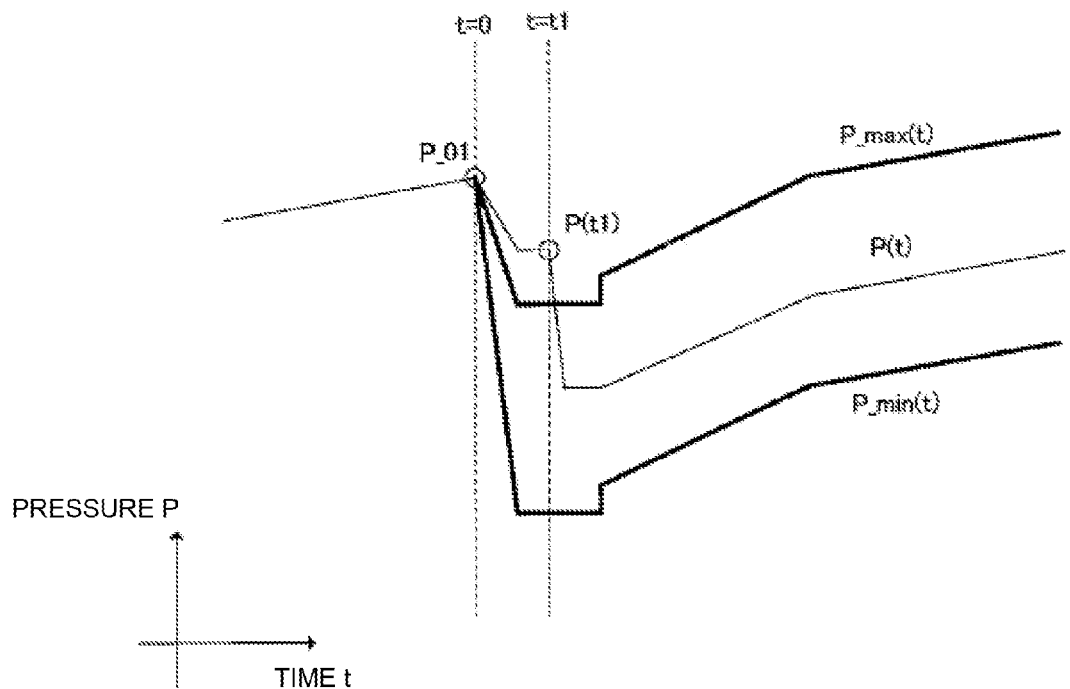
FIG. 3 is a diagram showing an example of a temporal change in the pressure of a wheel cylinder at a time when vehicle brake control according to the embodiment of the present invention is being executed.

When the driver operates a brake mechanism such as a foot brake pedal or a hand brake lever while driving the vehicle, the pressure inside the wheel cylinder rises as indicated by the fine solid line in FIG. 3.

At the time when the pressure in the wheel cylinder is rising, the speed of rotation of the wheel is measured by the wheel speed sensor 12, and the ECU 10 judges whether or not to start ABS control. Specifically, for example, the ECU 10 calculates the slip ratio of the wheel from the measurement value resulting from the wheel speed sensor 12 and judges whether or not to start ABS control by comparing the slip ratio with the predetermined value.

In the description below, it will be supposed that the ECU 10 has started the ABS operation at the time when t=0 in FIG. 3. When the ABS operation is started, thereafter (t≥0 in FIG. 3) the ECU 10 operates in accordance with the sequence shown in FIG. 2.

In step S10 in FIG. 2, the ECU 10 receives the wheel speed that has been measured by the wheel speed sensor 12.

Thereafter, in step S12, the ECU 10 judges whether the wheel state is "stable" or "unstable" from the received wheel speed. Specifically, the ECU 10 judges a case where the slip ratio of the wheel has exceeded the predetermined value as "unstable" and judges a case where the slip ratio of the wheel is equal to or less than the predetermined value as "stable." In FIG. 3, the time when t=0 is the time when the ECU 10 starts the ABS control, so the wheel state is judged as unstable. Thereafter, in step S14 to step S18 of FIG. 2, calculations are appropriately performed by the ECU 10, the pressure decreasing valve 16*b* is driven, and the pressure in the wheel cylinder is decreased. The operation from step S10 to step S18 is periodically repeated.

When the ECU 10 starts the ABS operation at t=0 in FIG. 3, the pressure sensor 14 measures a pressure P01 of the wheel cylinder at the time when the ECU 10 started the ABS operation. The measurement value of the pressure is sent to the ECU 10 and is saved in the memory of the ECU 10.

Moreover, at a time when a predetermined amount of time t1 has elapsed after the time when the ECU 10 started the ABS operation (t=0 in FIG. 3), in step 20 the ECU 10 receives a pressure value P(t1) that has been measured by the pressure sensor 14. Then, in step S22, the ECU 10 calculates an allowable range of pressure in the amount of time t1. At the time when t=1 in FIG. 3, the wheel is judged as being in an unstable state, and the allowable range of pressure in the amount of time t1 at this time is defined by an allowable maximum pressure Pmax(t1). In the present embodiment, the allowable maximum pressure Pmax(t1) is decided in accordance with the pressure P01 of the wheel cylinder that is measured at the time when ABS started and the amount of elapsed time t1 after the time when the ECU 10 started the ABS operation (t=0 in FIG. 3). Preferably, the allowable maximum pressure Pmax(t1) in the amount of time t1 is expressed by the equation Pmax(t1)=P01−ΔP(t1). Here, ΔP(t1) is a value that is decided beforehand in accordance with the amount of time t. In FIG. 3, as an example, Pmax(t) in an arbitrary amount of time t is indicated by a fat solid line. In the present embodiment, ΔP(t) is held beforehand in the ECU 10.

In the present embodiment, t1 can be an arbitrary value and can be freely set by persons skilled in the art. For example, t1 can be an amount of time assumed for the pressure decrease to end in conventional ABS control. For example, t1 can be 10 ms. Alternatively, a shorter amount of time may also be set as t1, and the ECU 10 may be configured to execute the steps of FIG. 2 repeatedly every time t1 elapses.

Next, in step S24, the ECU 10 judges whether or not to additionally drive the pressure decreasing valve 16*b* from the allowable maximum pressure Pmax(t1) that is calculated in step S22 and the wheel cylinder pressure P(t1) that is measured in step S20. At t=1 in FIG. 3, P(t1)>Pmax(t1), so in this case, the ECU 10 judges to drive the pressure decreasing valve 16*b*. Then, in step S16, the ECU 10 calculates a drive time of the pressure decreasing valve 16*b* so as to additionally drive the pressure decreasing valve 16*b* for a predetermined amount of time in step S16. That is, the ECU 10 adds the additional drive time that is judged in step S24 to the drive time of the pressure decreasing valve 16*b* based on the conventional ABS control sequence (step S10 to step S14). Persons skilled in the art can employ an arbitrary value for the additional drive time of the pressure decreasing valve 16*b*. For example, the additional drive time of the pressure decreasing valve 16*b* can be +5 ms. The additional drive time of the pressure decreasing valve 16*b* can be a fixed value that is not changed during driving of the vehicle; alternatively, the ECU 10 may be configured to change the additional drive time of the pressure decreasing valve 16*b* in accordance with the amount of elapsed time t1.

At t=1 in FIG. 3, the pressure decreasing valve 16*b* is additionally driven, whereby the pressure in the wheel cylinder is decreased as shown in FIG. 3.

As described above, in the present embodiment, at the time when the pressure in the wheel cylinder is in the allowable range of pressure in the pressure decrease phase during the ABS operation (a phase in which the wheel during the ABS operation is in an unstable state), ABS operation control is performed by the conventional ABS control sequence (S10, S12, S14, S16, and S18), but the control sequence (S20, S22, S24, S16, and S18) for ensuring the minimum amount of pressure decrease described above is executed apart from and in parallel with the conventional ABS control sequence. For that reason, according to the present embodiment, whatever the conventional ABS control sequence is in the pressure decrease phase at the time of ABS control, the minimum amount of pressure decrease delimited by the allowable maximum pressure Pmax(t) is ensured for the pressure inside the wheel cylinder. Whether or not the minimum amount of pressure decrease is being ensured is measured directly using the pressure sensor 14, so control with high reliability can be executed in relation to the pressure in the wheel cylinder.

Further, the ECU 10 calculates the allowable maximum pressure Pmax(t) from the pressure P01 of the wheel cylinder at the time when the ECU 10 started decreasing the pressure and the predetermined value ΔP(t), so as long as so-called zero-point shift of the pressure sensor does not arise between the measurement of P01 and the measurement of P(t), the problem of zero-point shift of the pressure sensor does not arise. Generally, it is inconceivable for zero-point shift to arise in such a short amount of time as the ABS operation cycle, so it can be said that in the present embodiment the problem of zero-point shift of the pressure sensor substantially does not arise.

In the embodiment described above, the ECU 10 employed the allowable maximum pressure Pmax(t) of the wheel cylinder pressure in order to ensure the minimum amount of pressure decrease, but as another embodiment, in order to likewise limit the amount of pressure decrease, the ECU 10 may also utilize an allowable minimum pressure Pmin(t) as shown in FIG. 3 to limit the amount of pressure decrease. In that case, it suffices for the ECU 10 to drive and control the pressure increasing valve 16a and the pressure decreasing valve 16b in such a way that the pressure P(t) of the wheel cylinder after the elapse of the predetermined amount of time satisfies the condition of Pmin(t)<P(t) or Pmin(t)<P(t)<Pmax(t).

Moreover, in the description of FIG. 3, the time when the ECU 10 first started the ABS control as a result of a brake operation by the driver is described as t=0, but during the ABS operation also, the sequence of the pressure decrease phase described above can be executed taking the time when the ABS control enters the pressure decrease phase again from the pressure increase phase as t=0.

Next, an operation sequence in the pressure increase phase during the ABS operation (a phase in which the wheel during the ABS operation is in a stable state) will be described together with FIG. 2 and FIG. 4. When the ABS operation is started and the pressure in the wheel cylinder is sufficiently decreased, the ABS control becomes stable and enters the pressure increase phase. When the ABS control enters the pressure increase phase, the pressure sensor 14 measures a pressure P02 of the wheel cylinder at the time when the ABS control entered the pressure increase phase from the pressure decrease phase (t=0 in FIG. 4) and stores the pressure P02 in the memory of the ECU 10. In order to determine the time when the ABS control entered the pressure increase phase from the pressure decrease phase, for example, the wheel state discrimination result of the previous time in step S12 is stored in the ECU 10, the wheel state the previous time is an unstable state, and the time when the wheel state this time changed to a stable state can be judged as the time when the ABS control entered the pressure increase phase.

When the wheel state is judged as stable in step S12 of FIG. 2, in step S14 to step S18, calculations are appropriately performed by the ECU 10, the pressure increasing valve 16a is driven, and the pressure in the wheel cylinder is increased.

At a time when a predetermined amount of time t2 has elapsed after the time when the ABS control started the pressure increase phase (t=0 in FIG. 4), in step S20 the ECU 10 receives a pressure P(t2) of the wheel cylinder that has been measured by the pressure sensor 14. Then, in step S22, the ECU 10 calculates an allowable range of pressure in the amount of time t2 from the wheel state and the pressure measurement value P(t2). At t=t2 in FIG. 4, the wheel state is judged as stable. In the present embodiment, the allowable range of pressure in the amount of time t2 in the pressure increase phase is defined by an allowable minimum pressure Pmin(t2). In the present embodiment, the allowable minimum pressure Pmin(t2) is decided in accordance with the pressure P01 of the wheel cylinder at the time when the ECU 10 started the ABS operation or the time when the ABS control entered the pressure decrease phase from the pressure increase phase, the pressure P02 of the wheel cylinder at the time when the ABS control entered the pressure increase phase, and the amount of elapsed time t2 after the ABS control entered the pressure increase phase (t=0 in FIG. 4). More specifically, Pmin(t2) in the amount of time t2 is decided in accordance with P02 (the pressure at the time when the pressure increase phase started), P01−P02 (the amount of pressure decrease in the pressure decrease phase), and t2 (the amount of elapsed time after the pressure increase phase started). As an example, the allowable minimum pressure Pmin(t) in an arbitrary amount of time t can be decided as indicated by a fat solid line in FIG. 4. The expression for calculating Pmin(t) is held beforehand in the ECU 10.

In the present embodiment, t2 can be an arbitrary value and can be freely set by persons skilled in the art. For example, t2 can be a value that is about ¼ one cycle time of the pressure increase phase assumed in ABS control; for example, t2 can be 60 ms.

Next, in step S24, the ECU 10 judges whether or not to additionally drive the pressure increasing valve 16a from the allowable minimum pressure Pmin(t2) that is calculated in the amount of time t2 and the pressure measurement value P(t2). At t=t2 in FIG. 4, P(t2)<Pmin(t), so in this case, the ECU 10 judges to additionally drive the pressure increasing valve 16a. Then, in step S16, the ECU 10 calculates a drive time of the pressure increasing valve 16a so as to additionally drive the pressure increasing valve 16a for a predetermined amount of time. That is, the ECU 10 adds the additional drive time that is judged and calculated in step S24 to the drive time of the pressure increasing valve 16a based on the conventional ABS control sequence (S10, S12, and S14). The additional drive amount of the pressure increasing valve 16a can be decided in accordance with P01−P02 (the amount of pressure decrease in the pressure decrease phase); for example, the additional drive time of the pressure increasing valve 16a can be decided in such a way as to be proportional to P01−P02. Alternatively, the additional drive time of the pressure increasing valve 16a may also be a fixed value that is not changed during driving of the vehicle.

Then, in step S18, the pressure increasing valve 16a is driven on the basis of the additional (corrected) drive amount introduced by the present invention in addition to the drive amount of the pressure increasing valve 16a based on the conventional ABS control sequence. As a result, as shown in FIG. 4, the pressure in the wheel cylinder rises, and the pressure in the wheel cylinder enters the allowable range of pressure.

As described above, in the present embodiment, at the time when the pressure in the wheel cylinder is in the allowable range in the pressure increase phase during the operation of the ABS, ABS operation control is performed by the conventional ABS control sequence (S10, S12, S14, S16, and S18), but the control sequence for ensuring the minimum amount of pressure increase described above is executed apart from and in parallel with the conventional ABS control sequence. For that reason, according to the present embodiment, whatever the conventional ABS control sequence is in the pressure increase phase at the time of ABS control, the minimum amount of pressure increase defined by the allowable minimum pressure Pmin(t) is ensured. Whether or not the minimum amount of pressure increase is being ensured is measured directly using the pressure sensor 14, so control with high reliability can be executed in relation to the pressure in the wheel cylinder.

Further, the ECU 10 calculates the allowable minimum pressure Pmin(t) from the pressure P01 of the wheel cylinder at the time when the ECU 10 started the ABS operation or the time when the ABS control entered the pressure decrease phase, the pressure P02 of the wheel cylinder at the time when the ABS control entered the pressure increase phase, and the amount of elapsed time t2 after the time when the ABS control entered the pressure increase phase (t=0 in FIG. 4), so as long as so-called zero-point shift of the pressure sensor does not arise between the measurement of P01 and the measurement of P(t2), the problem of zero-point shift of the pressure sensor does not arise. Generally, it is inconceivable for zero-point shift to arise in such a short amount of time as the ABS operation cycle, so it can be said that in the present embodiment the problem of zero-point shift of the pressure sensor substantially does not arise.

Figure 4:
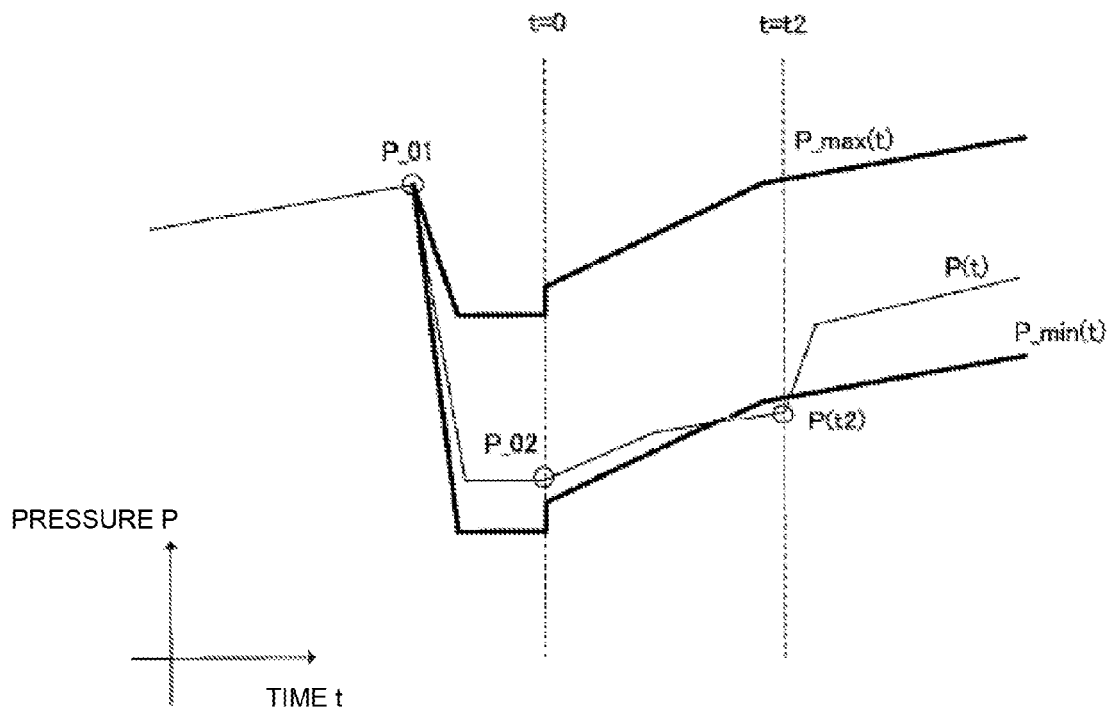
FIG. 4 is a diagram showing an example of a temporal change in the pressure of a wheel cylinder at a time when vehicle brake control according to the embodiment of the present invention is being executed.

In the embodiment described above, the ECU 10 employed the allowable minimum pressure Pmin(t) of the wheel cylinder pressure as the allowable range of pressure in order to ensure the minimum amount of pressure increase, but as another embodiment, in order to likewise limit the amount of pressure increase, the ECU 10 may also utilize an allowable maximum pressure Pmax(t) as shown in FIG. 4 to limit the amount of pressure increase. In that case, it suffices for the ECU 10 to drive and control the pressure increasing valve 16*a* and the pressure decreasing valve 16*b* in such a way that the pressure P(t) of the wheel cylinder after the elapse of the predetermined amount of time satisfies the condition of P(t) <Pmax(t) or Pmin(t)<P(t)<Pmax(t).

As described above, according to the embodiment of the present invention, even if conventional ABS control is performed on the basis of whatever sequence, or in whatever operating environment, the pressure in the wheel cylinder can be kept in the designed allowable range of pressure. Consequently, in the pressure decrease phase, the vehicle can be prevented from becoming unstable unexpectedly, and, in the pressure increase phase, the pressure increase can be prevented from being delayed unexpectedly, and the robustness of brake control can be improved. Further, because the conventional ABS control sequence is virtually unchanged, the robustness of the vehicle brake control device can be improved virtually without having to modify the conventional ABS control sequence.

The brake control device and method according to the present invention have been described above, but the present invention is not limited to the above embodiment. Various features of the above embodiment can be combined with each other to the extent that it is not contrary to the spirit of the invention. For example, the brake control device and method may also be configured to perform the brake control of the above embodiment in the pressure decrease phase and to perform only the conventional ABS control in the pressure increase phase. Conversely, the brake control device and method may also be configured to perform only the conventional ABS control in the pressure decrease phase and to perform the brake control of the above embodiment in the pressure increase phase.

The invention claimed is:

1. A vehicle brake control method, the method comprising:
measuring a pressure P01 inside the wheel cylinder at a time when the wheel lock tendency has been detected,
measuring a pressure Pt1 inside a wheel cylinder at a time when a predetermined amount of time t1 has elapsed after a time when a wheel lock tendency has been detected;
determining a value Pmax_t1, expressed by Pmax_t1=P01−ΔPt1, with ΔPt1 being a value that is decided beforehand in accordance with the amount of time t1;
comparing, by a controller, Pt1 with the predetermined value Pmax_t1; and
in a case where a condition of Pt1>Pmax_t1 is met in comparing Pt1 with the predetermined value Pmax_t1, the controller driving by a predetermined amount an actuator for decreasing the pressure in the wheel cylinder so as to decrease the pressure inside the wheel cylinder.

2. The method according to claim 1 wherein the predetermined drive amount of the actuator is a fixed amount that is not changed during driving of the vehicle.

3. A vehicle brake control method, the method comprising:
measuring a pressure P01 inside the wheel cylinder at a time when a wheel lock tendency has been detected;
measuring a pressure P02 inside the wheel cylinder at a time when the wheel lock tendency has been eliminated by decreasing the pressure inside the wheel cylinder;
measuring a pressure Pt2 inside a wheel cylinder at a time when a predetermined amount of time t2 has elapsed after a time when a wheel lock tendency has been detected and the wheel lock tendency has been eliminated as a result of decreasing the pressure inside the wheel cylinder;
comparing, by a controller, Pt2 with a predetermined value Pmin_t2; and
in a case where a condition of Pt2<Pmin_t2 is met in comparing Pt2 with the predetermined value Pmin_t2, the controller driving by a predetermined amount an actuator for increasing the pressure in the wheel cylinder so as to increase the pressure inside the wheel cylinder,
wherein Pmin_t2 is decided in accordance with P02, P01−P02, and t2.

4. A vehicle brake control method, the method comprising:
measuring a pressure P01 inside the wheel cylinder at a time when a wheel lock tendency has been detected;
measuring a pressure P02 inside the wheel cylinder at a time when the wheel lock tendency has been eliminated by decreasing the pressure inside the wheel cylinder;
counting an amount of elapsed time t2_*n* after the time when the wheel lock tendency is eliminated;
measuring a pressure Pt2_*n* inside a wheel cylinder every time a predetermined amount of time t2 elapses after a time when a wheel lock tendency has been detected and the wheel lock tendency has been eliminated as a result of decreasing the pressure inside the wheel cylinder;
comparing, by a controller, Pt2_*n* with a predetermined value Pmin_t2_*n*; and
in a case where a condition of Pt2_*n*<Pmin_t2_*n* is met in comparing Pt2_*n* with the predetermined value Pmin_t2_*n*, the controller driving by a predetermined amount an actuator for increasing the pressure in the wheel cylinder so as to increase the pressure inside the wheel cylinder,
wherein Pmin_t2_*n* is decided in accordance with P02, P01−P02, and t2_*n*.

5. A vehicle brake control device comprising:
a pressure sensor for measuring pressure that has been applied to a wheel cylinder;
a wheel speed sensor that is used for detecting a wheel lock tendency;
an actuator for controlling the pressure inside the wheel cylinder; and
a controller that is electrically connected to the pressure sensor, the wheel speed sensor, and the actuator, wherein the controller receives from the pressure sensor a pressure P01 inside the wheel cylinder at a time when a wheel lock tendency has been detected by the wheel speed sensor, and the controller further receives from the pressure sensor a pressure Pt1 inside the wheel cylinder at a time when a predetermined amount of time t1 has elapsed after a time when a wheel lock tendency has been detected by the wheel speed sensor, compares Pt1 with a predetermined value Pmax_t1, and, in a case where a condition of Pt1>Pmax_t1 is satisfied, drives the actuator by a predetermined amount so as to decrease the pressure inside the wheel cylinder, wherein Pmax_t1 is expressed by Pmax_t1=P01−ΔPt1, with ΔPt1 being a value that is decided beforehand in accordance with the amount of time t1.

6. The vehicle brake control device according to claim 5, wherein the predetermined drive amount of the actuator is a fixed amount that is not changed during driving of the vehicle.

7. A vehicle brake control device comprising:

a pressure sensor for measuring pressure that has been applied to a wheel cylinder;

a wheel speed sensor that is used for detecting a wheel lock tendency;

an actuator for controlling the pressure inside the wheel cylinder; and a controller electrically connected to the pressure sensor, the wheel speed sensor, and the actuator, wherein the controller receives from the pressure sensor a pressure P01 inside the wheel cylinder at a time when a wheel lock tendency has been detected by the wheel speed sensor, the controller further receives from the pressure sensor a pressure P02 inside the wheel cylinder at a time when the wheel lock tendency has been eliminated by decreasing the pressure inside the wheel cylinder, and the controller further receives from the pressure sensor a pressure Pt2 inside the wheel cylinder at a time when a predetermined amount of time t2 has elapsed after a time when a wheel lock tendency has been detected by the wheel speed sensor and the wheel lock tendency has been eliminated as a result of decreasing the pressure inside the wheel cylinder, compares Pt2 with a predetermined value Pmin_t2, and, in a case where a condition of Pt2<Pmin_t2 is met, drives the actuator by a predetermined amount so as to increase the pressure inside the wheel cylinder, wherein Pmin_t2 is decided in accordance with P02, P01−P02, and t2.

8. A vehicle brake control device comprising:

a pressure sensor for measuring pressure that has been applied to a wheel cylinder;

a wheel speed sensor that is used for detecting a wheel lock tendency;

an actuator for controlling the pressure inside the wheel cylinder; and a controller electrically connected to the pressure sensor, the wheel speed sensor, and the actuator, wherein the controller receives from the pressure sensor a pressure P01 inside the wheel cylinder at a time when a wheel lock tendency has been detected by the wheel speed sensor, the controller further receives from the pressure sensor a pressure P02 inside the wheel cylinder at a time when the wheel lock tendency has been eliminated by decreasing the pressure inside the wheel cylinder, the controller further counts an amount of elapsed time t2_$n$ after the time when the wheel lock tendency is eliminated, and the controller further receives from the pressure sensor a pressure Pt2_$n$ inside the wheel cylinder every time a predetermined amount of time t2 elapses after a time when a wheel lock tendency has been detected by the wheel speed sensor and the wheel lock tendency has been eliminated as a result of decreasing the pressure inside the wheel cylinder, compares Pt2_$n$ with a predetermined value Pmin_t2_$n$, and, in a case where a condition of Pt2_$n$<Pmin_t2_$n$ is met, drives the actuator by a predetermined amount so as to increase the pressure inside the wheel cylinder, wherein Pmin_t2_$n$ is decided in accordance with P02, P01−P02, and t2_$n$.

9. A vehicle comprising the vehicle brake control device according to claim 5.

* * * * *